(12) United States Patent
Katakura et al.

(10) Patent No.: US 8,331,041 B2
(45) Date of Patent: Dec. 11, 2012

(54) IMAGING OPTICAL SYSTEM AND IMAGE-ACQUISITION APPARATUS

(75) Inventors: Masahiro Katakura, Tokyo (JP); Hideyasu Takato, Tokyo (JP); Yuji Kamo, Tokyo (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 13/307,540

(22) Filed: Nov. 30, 2011

(65) Prior Publication Data
US 2012/0133802 A1    May 31, 2012

Related U.S. Application Data

(63) Continuation of application No. PCT/JP2011/061269, filed on May 17, 2011.

(30) Foreign Application Priority Data

May 28, 2010 (JP) .................................. 2010-122845

(51) Int. Cl.
*G02B 13/04* (2006.01)
(52) U.S. Cl. .......................... 359/753; 359/751; 359/752
(58) Field of Classification Search .................. 359/749, 359/750, 751, 752, 753
See application file for complete search history.

(56) References Cited

U.S. PATENT DOCUMENTS

| | | | |
|---|---|---|---|
| 5,424,877 A | 6/1995 | Tsuyuki et al. | |
| 7,697,220 B2 * | 4/2010 | Iyama | 359/753 |
| 2009/0103187 A1 | 4/2009 | Watanebe et al. | |

FOREIGN PATENT DOCUMENTS

| | | |
|---|---|---|
| JP | 5-288986 | 11/1993 |
| JP | 06-292207 | 10/1994 |
| JP | 09-224180 | 8/1997 |
| JP | 10-260348 A | 9/1998 |
| JP | 11-119094 | 4/1999 |
| JP | 11-249016 | 9/1999 |
| JP | 2006-064904 | 3/2006 |
| JP | 2007-017528 | 1/2007 |
| JP | 2007-148137 | 6/2007 |
| JP | 2007-249189 A | 9/2007 |
| JP | 2008-151904 | 7/2008 |
| JP | 2008-152210 | 7/2008 |
| JP | 2008-176183 | 7/2008 |
| JP | 2008-281857 | 11/2008 |
| JP | 2009-75581 | 4/2009 |
| JP | 2009-128654 | 6/2009 |

* cited by examiner

*Primary Examiner* — Scott J Sugarman
(74) *Attorney, Agent, or Firm* — Scully, Scott, Murphy & Presser, P.C.

(57) ABSTRACT

Provided is an imaging optical system and an image acquisition apparatus that can be suitably used in a small-diameter endoscope while having an ultra-wide angle of view. Provided is an image optical system (1) containing, in order from the object side, a negative front group (FG), an aperture stop (S), and a positive back group (BG), wherein the front group (FG) contains, in order from the object side, a negative first lens (L1) and a negative second lens (L2), and the back group (BG) contains a cemented lens (CL) constituted of at least three lenses (L5, L6, L7) joined together.

10 Claims, 11 Drawing Sheets

IMAGING OPTICAL SYSTEM AND IMAGE-ACQUISITION APPARATUS

CROSS-REFERENCE TO RELATED APPLICATIONS

This is a continuation of International Application PCT/JP2011/061269, with an international filing date of May 17, 2011, which is hereby incorporated by reference herein in its entirety. This application claims the benefit of Japanese Patent Application No. 2010-122845, the content of which is incorporated herein by reference.

TECHNICAL FIELD

The present invention relates to an imaging optical system and an image-acquisition apparatus.

BACKGROUND ART

In the related art, there is a known optical system that has a relatively large angle of view and that corrects chromatic aberration by using a cemented lens in the optical system (for example, refer to PTL 1 to PTL 6.

CITATION LIST

Patent Literature

PTL 1: Japanese Unexamined Patent Application, Publication No. HEI 11-119094
PTL 2: Japanese Unexamined Patent Application, Publication No. 2008-176183
PTL 3: Japanese Unexamined Patent Application, Publication No. 2006-64904
PTL 4: Japanese Unexamined Patent Application, Publication No. 2007-148137
PTL 5: Japanese Unexamined Patent Application, Publication No. 2008-151904
PTL 6: Japanese Unexamined Patent Application, Publication No. 2008-152210

SUMMARY OF INVENTION

Technical Problem

The optical systems described in PTL 1 to PTL 3 and PTL 6 have an angle of view that is unsatisfactory for installing them in endoscopes and be used for internal diagnosis. That is, with such optical systems, it is difficult to thoroughly examine inside the body, which has three-dimensional structures with depressions and protrusions; for example, it is difficult to examine the back side of an intestinal fold. A front group of the optical systems described in PTL 4 and PTL 5 contains one negative lens. Thus, to achieve negative power, the curvature of the negative lens must be set extremely large, making the negative lens difficult to manufacture and causing the lens diameter to increase due to the inability to move the entrance pupil position toward the object side.

The present invention provides an imaging optical system and an image acquisition apparatus that can be suitably used in a small-diameter endoscope, even when the angle of view is extremely wide.

Solution to Problem

A first aspect of the present invention is an imaging optical system including a negative front group; an aperture stop; and a positive back group, in this order from the object side, wherein the front group contains, in order from the object side, a negative first lens and a negative second lens, and the back group includes a cemented lens formed by joining together at least three lenses.

A second aspect of the present invention is an imaging optical system including a negative front group; an aperture stop; and a positive back group, in this order from the object side, wherein the front group contains, in order from the object side, a negative first lens and a negative second lens, and the back group includes a cemented lens formed by joining together at least a positive lens and a negative lens, wherein the half angle of view is 100° or larger. In this aspect, it is more preferable that the half angle of view be 110° or larger.

In the first and second aspects described above, the first lens preferably satisfies conditional expression (1) below $$1.888 \leq nd1 < 2.4 \tag{1},$$

where nd1 represents the index of refraction at the d line of the first lens.

Conditional expression (1) relates to the first lens.

A third aspect of the present invention is an imaging optical system including a negative front group; an aperture stop; and a positive back group, in this order from the object side, wherein the front group contains, in order from the object side, a negative first lens and a negative second lens, and the back group includes a cemented lens formed by joining together at least a positive lens and a negative lens, wherein conditional expression (1) below is satisfied:

$$1.888 \leq nd1 < 2.4 \tag{1},$$

where nd1 represents the index of refraction at the d line of the first lens L1.

In the third aspect described above, it is more preferable that the half angle of view be 110° or larger.

In the first to third aspects described above, in the back group, the compound lens may be disposed closest to the image, and the compound lens may be formed by joining a positive lens, a negative lens, and a positive lens, in this order from the object side.

In the first to third aspects described above, the back group may include at least two positive lenses and a cemented lens formed by joining together a positive lens, a negative lens, and a positive lens, in this order from the object side.

In the above configuration including the cemented lens formed of the positive lens, the negative lens, and the positive lens, the cemented lens may satisfy conditional expression (2) below:

$$0.5 < Pw5/Pw7 < 3.0 \tag{2},$$

where Pw5 represents the power of a positive lens disposed closest to the object among the lenses composing the cemented lens, and Pw7 represents the power of a positive lens disposed closest to the image among the lenses composing the cemented lens.

Conditional expression (2) is associated with the power arrangement of the cemented lens.

In the above configuration including the cemented lens formed of the positive lens, the negative lens, and the positive lens, the cemented lens may satisfy conditional expressions (3) and (4) below:

$$30 < vr5 - vr6 < 80 \tag{3; and}$$

$$20 < vr7 - vr6 < 80 \tag{4},$$

where vr5 represents the Abbe number of a positive lens disposed closest to the object among the lenses composing the cemented lens, vr6 represents the Abbe number of a negative lens among the lenses composing the cemented lens, and vr7 represents the Abbe number of a positive lens disposed closest to the image among the lenses composing the cemented lens.

Conditional expressions (3) and (4) are associated with the achromatic effect of the cemented lens.

In the first to third aspects described above, the first lens may satisfy conditional expression (5) below:

$$1.0<(r1+r2)/(r1-r2)<5.0 \qquad (5),$$

where r1 represents the radius of curvature of the object-side surface of the first lens, and r2 represents the radius of curvature of the image-side surface of the first lens.

Conditional expression (5) is associated with the shape factor of the first lens.

In the first to third aspects described above, the second lens may satisfy conditional expression (6) below:

$$0.5<(r3+r4)/(r3-r4)<6.0 \qquad (6),$$

where r3 represents the radius of curvature of the object-side surface of the second lens, and r4 represents the radius of curvature of the image-side surface of the second lens.

Conditional expression (6) is associated with the shape factor of the second lens.

In the first to third aspects described above, the front group may satisfy conditional expression (7) below:

$$0.2<Pw1/Pw2<2.0 \qquad (7),$$

where Pw1 represents a power value of the first lens, and Pw2 represents a power value of the second lens.

Conditional expression (7) is associated with the power arrangement of the front group.

A fourth aspect of the present invention is an image acquisition apparatus comprising the imaging optical system according to above-described first to third aspects; an image acquisition unit configured to acquire an optical image formed by the imaging optical system and to convert the acquired optical image to a digital image; and an image processing unit configured to generate a corrected image by subjecting the digital image acquired by the image acquisition unit to image processing for correcting aberration in the digital image.

A fifth aspect of the present invention is an image acquisition apparatus comprising the imaging optical system according to the above-described first to third aspects; an image acquisition unit configured to acquire an optical image formed by the imaging optical system and to convert the acquired optical image to a digital image; and a correction circuit configured to electrically correct chromatic aberration of magnification of the digital image acquired by the image acquisition unit.

DESCRIPTION OF EMBODIMENTS

An imaging optical system 1 according to an embodiment of the present invention will be described below with reference to FIG. 1.

Figure 1:
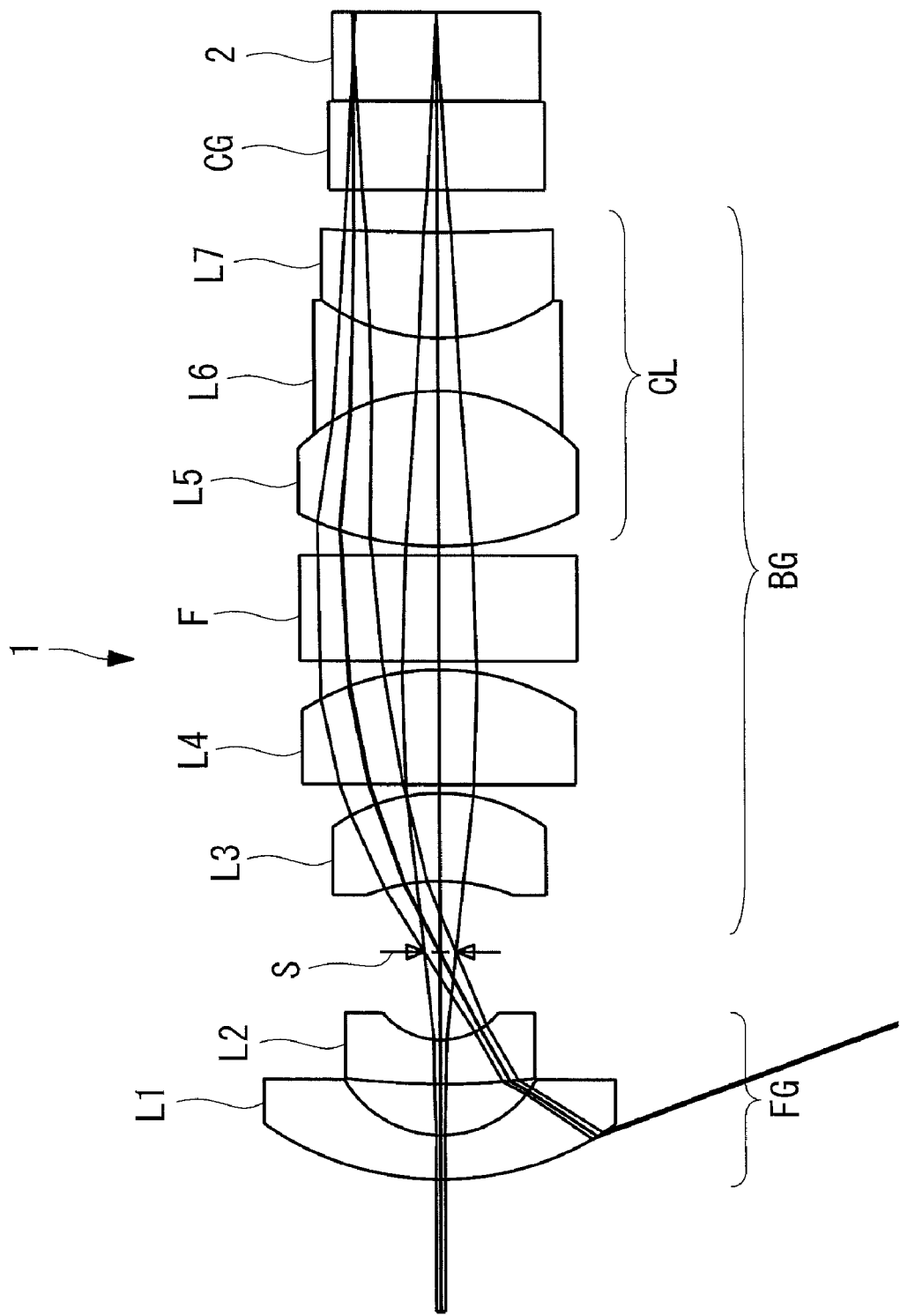
FIG. 1 is a configuration diagram illustrating, in outline, an imaging optical system according to an embodiment of the present invention.

As illustrated in FIG. 1, the imaging optical system 1 according to this embodiment includes, in order from the object side, a negative front group FG, an aperture stop S, and a positive back group BG.

The front group FG contains a negative first lens L1 and a negative second lens L2. The first lens L1 and the second lens L2 are meniscus lenses each having a convex surface facing the object side.

In this way, by disposing the negative front group, the aperture stop, and the positive back group in this order from the object side, the number of lenses that constitute each group can be reduced, the entire length can be reduced, and manufacturing costs can be reduced. Since the front group contains negative first and second lenses, the principal point of the front group is positioned on the object side. In this way, it is possible to have a wide-angle lens configuration as well as a small first lens diameter, which tends to be large in a wide-angle lens configuration, thus making realizing a narrow-diameter optical system.

The back group BG contains, in order from the object side, a positive third lens L3, a positive fourth lens L4, a parallel plate F, and a positive cemented lens CL. The third lens L3 is a positive meniscus lens having a convex surface facing the image side. The fourth lens L4 is a plano-convex lens having a convex surface facing the object side. The cemented lens CL is formed by bonding together three lenses: a fifth lens L5, which is a biconvex lens having the surface with the larger curvature facing the image side; a sixth lens L6, which is a biconcave lens; and a seventh lens L7, which is a biconvex lens having the surface with the larger curvature facing the object side.

Since the back group has a cemented lens that is formed by joining together at least three lenses, on-axis and off-axis chromatic aberrations can be corrected satisfactorily. Moreover, by using a cemented lens, it is possible to directly fix the lenses together without using a frame; therefore, axial displacement of the lenses in the back group can be effectively prevented, and its influence on aberrations due to relative decentering of the lenses can be suppressed.

The parallel plate F is a filter that blocks light of a particular wavelength, such as 1060 nm light of a YAG laser, 810 nm light of a semiconductor laser, or light in the near-infrared region.

An image acquisition device 2 is disposed near the image plane. Reference characters CG represent a cover glass provided to protect the image acquisition surface of the image acquisition device. In this way, the imaging optical system according to this embodiment can be combined with the image acquisition device 2 for use in an optical system for endoscopes and digital cameras.

The first lens L1 satisfies conditional expression (1):

$$1.888 \leq nd1 < 2.4 \quad (1),$$

where nd1 represents the index of refraction at the d line of the first lens L1.

Conditional expression (1) relates to the first lens. By setting the index of refraction of the first lens within the range defined by conditional expression (1), a wide angle of view can be achieved without causing total reflection, even without setting the curvature of the object side of the first lens excessively large.

In this way, by using a lens made of a material having a large index of refraction as the first lens L1, the angle of view can be kept large, and the diameter and curvature of the first lens L1 can be kept small. The index of refraction nd1 of the first lens L1 preferably satisfies 1.9<nd1<2.4 and more preferably satisfies 2.1<nd1<2.4.

It is undesirable if the index of refraction of the first lens falls below the lower limit of conditional expression (1) because the curvature of the object-side surface of the first lens would have to be significantly increased to prevent total reflection when the incident angle of a light beam is large, causing the lens diameter to be large. It is undesirable if the index of refraction of the first lens exceeds the upper limit of conditional expression (1) because manufacturing or procurement of the lens would become difficult and costs would soar.

The cemented lens CL satisfies conditional expression (2):

$$0.5 < Pw5/Pw7 < 3.0 \quad (2),$$

where Pw5 represents the power of the fifth lens L5, and Pw7 represents the power of the seventh lens L7.

Conditional expression (2) is associated with the power arrangement of the cemented lens. If the power ratio of the positive lenses is within the range of conditional expression (2), the positive power can be sufficiently distributed between the positive lenses, and thus, chromatic aberration, spherical aberration, and comatic aberration can be satisfactorily corrected. It is undesirable if the power ratio is not in the range of conditional expression (2) because the power would be biased to one of the positive lenses, and various types of aberrations would be more likely to occur.

In this way, by setting the power balance between the two positive lenses L5 and L7, which constitute the cemented lens CL, chromatic aberration, spherical aberration, and comatic aberration can be satisfactorily corrected. The power values Pw5 and Pw7 of the fifth and seventh lenses L5 and L7 preferably satisfy 1.0<Pw5/Pw7<2.0 and, more preferably, satisfy 1.2<Pw5/Pw7<1.8.

Moreover, the cemented lens CL satisfies conditional expressions (3) and (4):

$$30 < vr5 - vr6 < 80 \quad (3), \text{ and}$$

$$20 < vr7 - vr6 < 80 \quad (4),$$

where vr5 represents the Abbe number of the fifth lens L5, vr6 represents the Abbe number of the sixth lens L6, and vr7 represents the Abbe number of the seventh lens L7.

Conditional expressions (3) and (4) are associated with the achromatic effect of the cemented lens. If the relationship between the Abbe numbers of the lenses satisfies conditional expressions (3) and (4), the cemented lens will have a sufficient chromatic aberration correction effect. It is undesirable if the relationship between the Abbe numbers of the lenses falls below the lower limits of conditional expressions (3) and (4) because it would become difficult to achieve a sufficient achromatic effect, and on-axis and off-axis chromatic aberrations would occur. It is undesirable if the relationship between the Abbe numbers of the lenses exceeds the upper limits of the conditional expression (3) and (4) because it would be difficult to obtain glass materials.

By setting the differences among the Abbe numbers vr5, vr6, and vr7 of the lenses L5, L6, and L7 in this way, chromatic aberration can be satisfactorily corrected. The Abbe numbers vr5, vr6, and vr7 of the lenses L5, L6, and L7 preferably satisfy 33<vr5−vr6<70 and 21<vr7−vr6<70 and, more preferably, satisfy 35<vr5−vr6<60 and 21.5<vr7−vr6<60.

The first lens L1 satisfies conditional expression (5):

$$1.0 < (r1+r2)/(r1-r2) < 5.0 \quad (5),$$

where r1 represents the radius of curvature of the object-side surface of the first lens L1, and r2 represents the radius of curvature of the image-side surface of the first lens L1.

Conditional expression (5) is associated with the shape factor of the first lens. If the radius of curvature of each surface of the first lens satisfies conditional expression (5), negative power can be achieved while maintaining a wide angle of view and not causing total reflection. It is undesirable if the relationship between the radii of curvature of the surfaces of the first lens falls below the lower limit of conditional expression (5) because the diameter of the first lens would increase, and total reflection would be more likely to occur with a wide angle of view. It is undesirable if the relationship between the radii of curvature of the surfaces of the first lens exceeds the upper limit of conditional expression (5) because the ease of manufacture of the first lens would decrease significantly.

By setting the shape factor of the first lens L1 in this way, the required negative power can be achieved while maintaining a wide angle of view and not causing total reflection. The radii of curvature r1 and r2 of the surfaces of the first lens L1 preferably satisfy 1.5<(r1+r2)/(r1−r2)<3.0 and, more preferably satisfy 2.0<(r1+r2)/(r1−r2)<2.3.

The second lens L2 satisfies conditional expression (6):

$$0.5 < (r3+r4)/(r3-r4) < 6.0 \quad (6),$$

where r3 represents the radius of curvature of the object-side surface of the second lens L2, and r4 represents the radius of curvature of the image-side surface of the second lens L2.

Conditional expression (6) is associated with the shape factor of the second lens. If the radii of curvature of the surfaces of the second lens satisfy conditional expression (6), sufficient negative power is achieved while suppressing, in particular, off-axis aberration. If the relationship between the radii of curvature of surfaces of the second lens exceeds the upper limit of conditional expression (6), it is undesirable because sufficient negative power of the second lens would not be achieved, and the optical system would become very large because the principal point would move toward the image side. It is undesirable if the relationship between the radii of curvature of the surfaces of the second lens falls below the lower limit of conditional expression (6) because the curvature of the object-side surface of the second lens would become too large, and off-axis aberration, such as distortion, would be more likely to occur.

In this way, by setting the shape factor of the second lens L2, sufficient negative power is achieved while suppressing, in particular, off-axis aberration. The radii of curvature r3 and r4 of the surfaces of the second lens L2 preferably satisfy 0.8<(r3+r4)/(r3−r4)<3.0 and, more preferably, satisfy 1.1<(r3+r4)/(r3−r4)<1.3.

The first lens L1 and the second lens L2 satisfy conditional expression (7):

$$0.2 < Pw1/Pw2 < 2.0 \quad (7),$$

where Pw1 represents the power value of the first lens L1, and Pw2 represents the power value of the second lens L2.

Conditional expression (7) is associated with the power arrangement of the front group. If the power ratio of the lenses is within the range defined by conditional expression (7), the lens diameter can be decreased while maintaining a wide angle of view. It is undesirable if the power ratio of the lenses exceeds the upper limit of conditional expression (7) because the power of the first lens would become too large, making it difficult to maintain a wide angle of view and making, in particular, off-axis aberration more likely to occur. It is undesirable if the power ratio of the lenses falls below the lower limit of conditional expression (7) because the second lens would become too large, making off-axis aberration more likely to occur and causing the first lens to become very large.

In this way, by distributing the power in the front group FG, the diameter of the first lens L1 can be reduced while maintaining a wide angle of view. The power values Pw1 and Pw2 of the first lens L1 and second lens L2 preferably satisfy $0.2 < Pw1/Pw2 < 1.0$ and, more preferably, satisfy $0.3 < Pw1/Pw2 < 0.6$.

With the imaging optical system 1 according to this embodiment configured as described above, even with a ultra-wide angle of view, the diameter of the first lens L1, which tends to increase in particular as the angle of view is widened, can be set small. Therefore, there is an advantage in that it can be appropriately installed in a small-diameter endoscope, such as a gastroenterological endoscope. Also, there are advantages in that sites that are difficult to sufficiently examine with known endoscopes, such as the back side of an intestinal fold, can be easily examined, and diagnostic accuracy using endoscopic images can be improved.

The imaging optical system 1 according to this embodiment configured as described above can be installed in an image acquisition apparatus. The image acquisition apparatus includes, for example, in order from the object side, the imaging optical system 1, the image acquisition (image acquisition unit) device 2, a correction circuit, and an image processing unit. The image acquisition device 2 is, for example, a CCD and converts an optical image formed by the imaging optical system 1 to a digital image. The correction circuit carries out processing for correcting chromatic aberration of magnification of the digital image acquired by the image acquisition device. The image processing unit carries out image processing for correcting distortion in the digital image that has been corrected at the correction circuit.

With the above-described image acquisition apparatus, it is possible to acquire a satisfactory image by electrically correcting chromatic aberration of magnification in an optical image formed by the imaging optical system.

With the above-described image acquisition apparatus, corrected images with electrically corrected barrel distortion, which tends to occur in particular at the wide-angle end as the angle of view is widened, can be recorded or displayed.

In general, when images are acquired using the image acquisition device 2 installed in, for example, an endoscope or an electronic still camera, the image of an object is separated into three primary-color images, i.e., a first primary-color image, a second primary-color image, and a third primary-color image, and then a color image is reproduced by superposing the output signals of the three colors computationally. When the imaging optical system 1 has chromatic aberration of magnification, the position where the image is formed by light of the second and third primary colors is displaced from the position where the image is formed by light of the first primary color, with reference to the image formed by the first primary color. To electrically correct the chromatic aberration of magnification caused by such displacement, the displacement amount of the position where the images formed by light of the second and third primary colors with respect to the position where the image formed by the light of the first primary color should be calculated in advance for the picture elements in the image acquisition device 2 on the basis of the aberration information of the optical system. Then, coordinate transformation is performed on each pixel of the acquired image so as to correct the displacement amount between the first primary color and the second and third primary colors.

For example, when red (R), blue (B), and green (G) are used as the three primary colors, the displacement in the imaging positions of R and B relative to the imaging position of G is calculated for each pixel, coordinate transformation of the R and B images is performed to cancel out the calculated displacement, and then, the coordinate-transformed images are superposed with the G image.

Since chromatic aberration of magnification changes in accordance with zooming, focusing, and the aperture value, it is more desirable to store, in a storage device etc., the displacement between the position of the image formed by light of the first primary color and the position of the images formed by light of the second and third primary colors as correction data, for each lens position (zooming, focusing, and aperture). In this way, a second-primary-color signal and a third-primary-color signal, whose displacement is corrected, can be output for a first-primary-color signal.

In general, in an imaging optical system, as the angle of view widens, barrel distortion is more likely to occur. Thus, by installing an imaging optical system having an ultra-wide angle of view, such as the imaging optical system 1, and combining it with an image processing unit, an even more satisfactory image with reduced distortion can be acquired.

EXAMPLES

Examples 1 to 5 of the above-described embodiment will be described below with reference to FIGS. 2 to 11.

In the lens data provided in this document, the surface number represents the number of the optical surface as counted from the object side, the index of refraction represents the index of refraction at the d line, and the unit of radius of curvature and the spacing between surfaces is mm. In the accompanying lens sectional views, r1, r2, r3, . . . respectively represent the optical surfaces having surface numbers 1, 2, 3, . . . ; d1, d2, d3, . . . respectively represent the inter-surface spacing, or air space, of the surfaces having surface numbers 1, 2, 3, . . . ; and the arrow X represents the object surface. In the accompanying aberration diagrams, (a) represents spherical aberration, (b) represents astigmatism, (c) represents distortion, and (d) represents chromatic aberration of magnification. The horizontal axes represent the aberration (mm), except for that of distortion, and the unit of wavelength is nm.

Example 1

Figure 2:
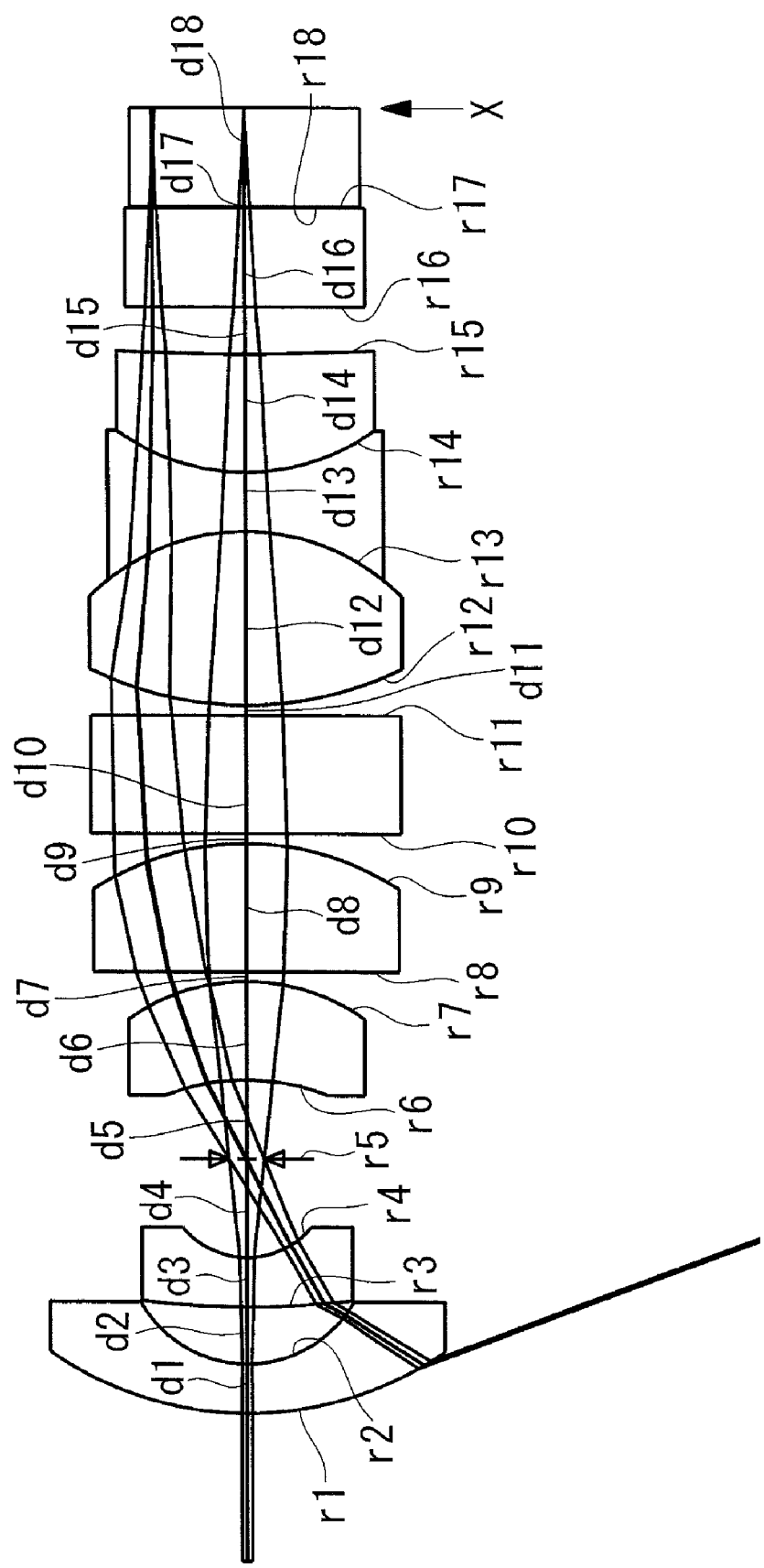
FIG. 2 is a lens sectional view of an imaging optical system according to Example 1 of the present invention.

A lens sectional view of an imaging optical system according to Example 1 of the present invention is illustrated in FIG. 2, and the corresponding lens data is listed below.

The imaging optical system according to this example contains, in order from the object side, a negative front group, an aperture stop, and a positive back group. The front group contains, in order from the object side, a negative meniscus lens having a convex surface facing the object side and a negative meniscus lens having a convex surface facing the object side. The back group includes, in order from the object side, a positive meniscus lens having a convex surface facing the image side, a positive lens having a convex surface facing the image side, a parallel plate, and a positive cemented lens. The cemented lens is formed by bonding together three lenses, in order from the object side: a biconvex lens having the surface with the larger curvature facing the image side, a biconcave lens, and a biconvex lens having the surface with the larger curvature facing the object side.

By distributing positive power in this way, on-axis aberration, in particular, can be satisfactorily corrected.

The imaging optical system according to this example satisfies conditional expressions (1) to (7).

Figure 3:
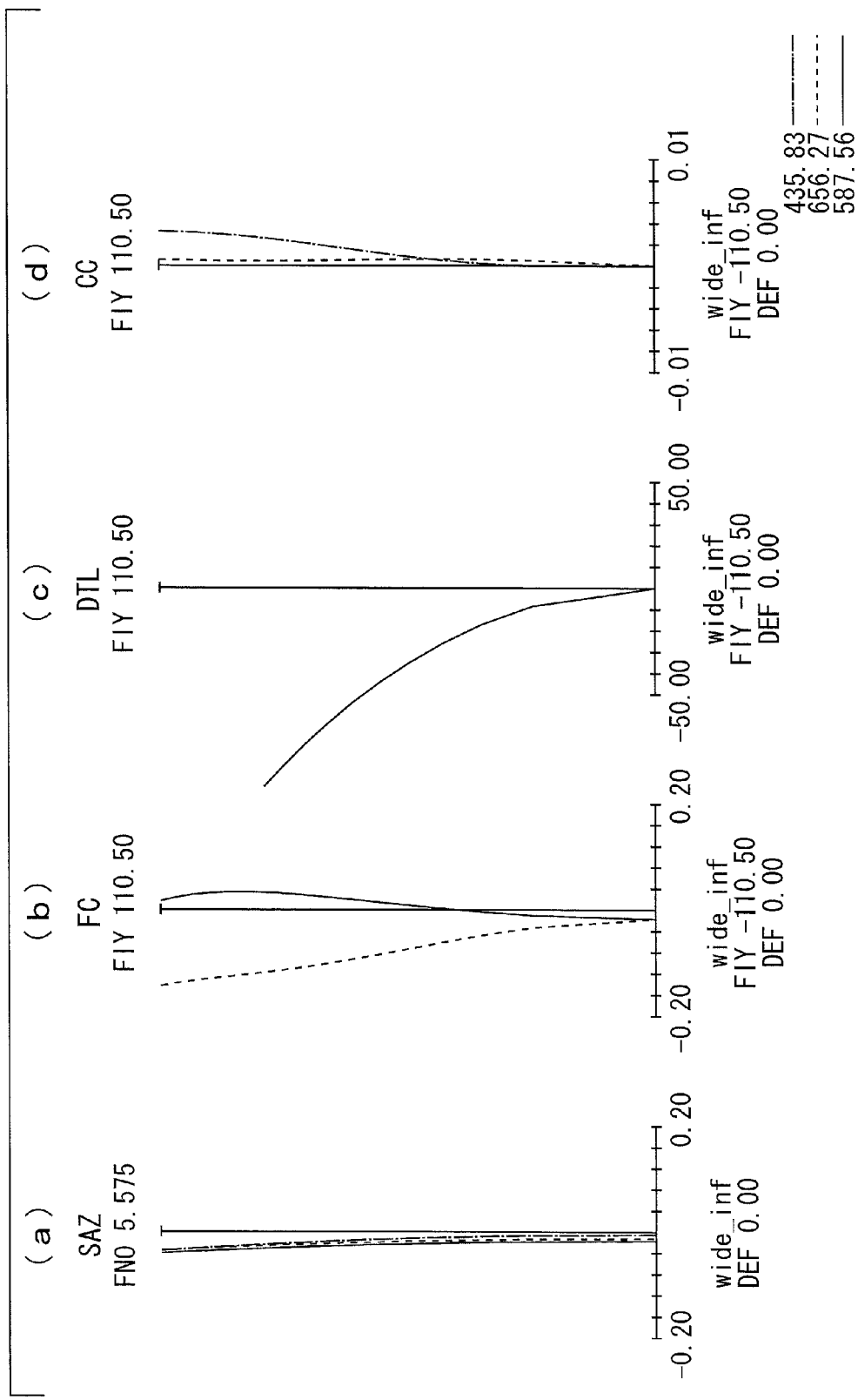
FIG. 3 is an aberration diagram of the imaging optical system in FIG. 2.

The aberration diagram for the imaging optical system according to this example having the above-described configuration is illustrated in FIG. 3.

Lens Data

| Surface number | Radius of curvature | Surface interval | Index of refraction | Abbe number |
|---|---|---|---|---|
| 1 | 1.762 | 0.25 | 2.17000 | 33.00 |
| 2 | 0.625 | 0.29 | | |
| 3 | 4.745 | 0.25 | 2.00330 | 28.27 |
| 4 | 0.427 | 0.50 | | |
| 5 | Aperture stop | 0.40 | | |
| 6 | −1.131 | 0.50 | 1.88300 | 40.76 |
| 7 | −1.041 | 0.05 | | |
| 8 | ∞ | 0.65 | 1.64769 | 33.79 |
| 9 | −1.425 | 0.05 | | |
| 10 | ∞ | 0.60 | 1.51800 | 75.01 |
| 11 | ∞ (Flare stop) | 0.05 | | |
| 12 | 1.800 | 0.88 | 1.72916 | 54.68 |
| 13 | −1.122 | 0.30 | 1.92286 | 18.90 |
| 14 | 1.122 | 0.60 | 1.88300 | 40.76 |
| 15 | 13.117 | 0.24 | | |
| 16 | ∞ | 0.50 | 1.51633 | 64.14 |
| 17 | ∞ | 0.01 | 1.51000 | 63.01 |
| 18 | ∞ | 0.50 | 1.51633 | 64.14 |
| Image plane | ∞ | | | |

Example 2

Figure 4:
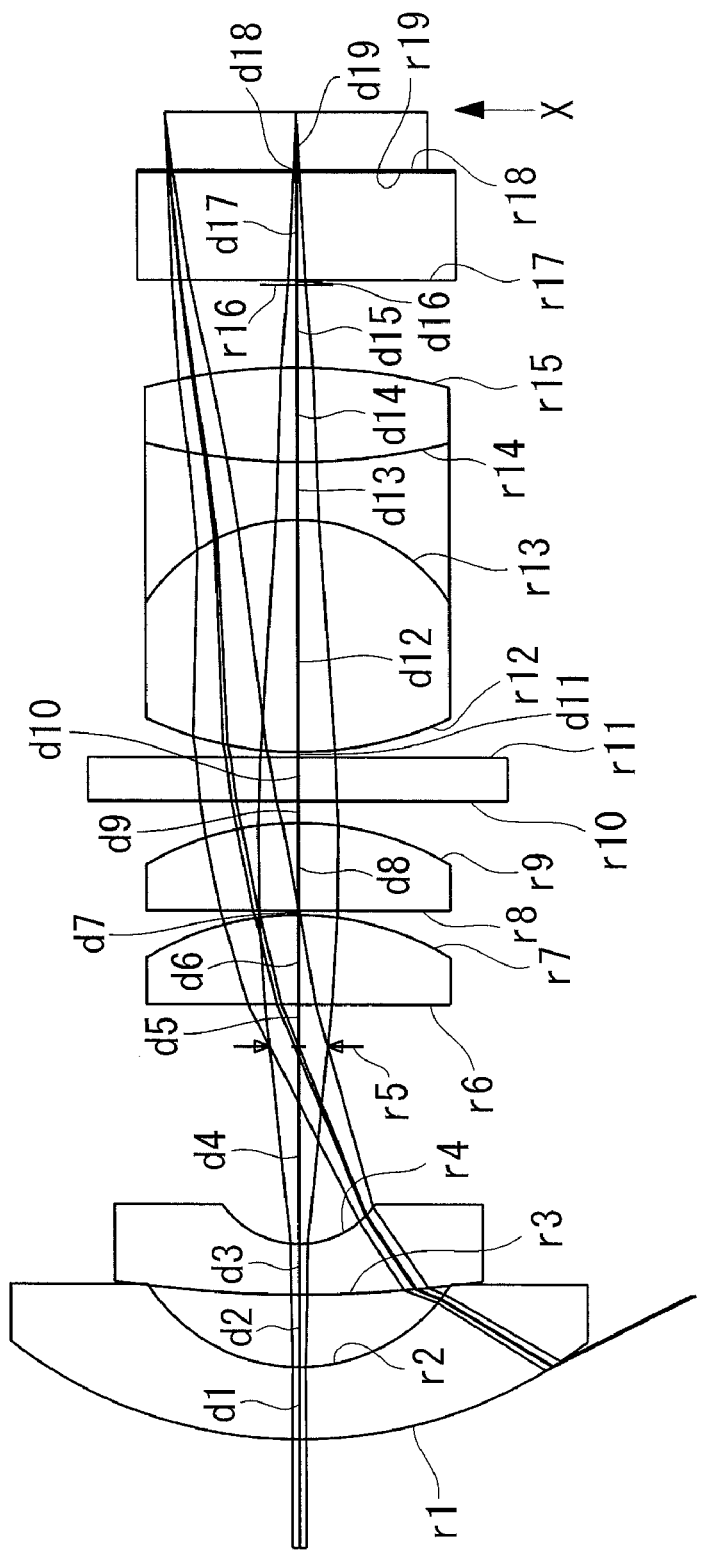
FIG. 4 is a lens sectional view of an imaging optical system according to Example 2 of the present invention.
Figure 5:
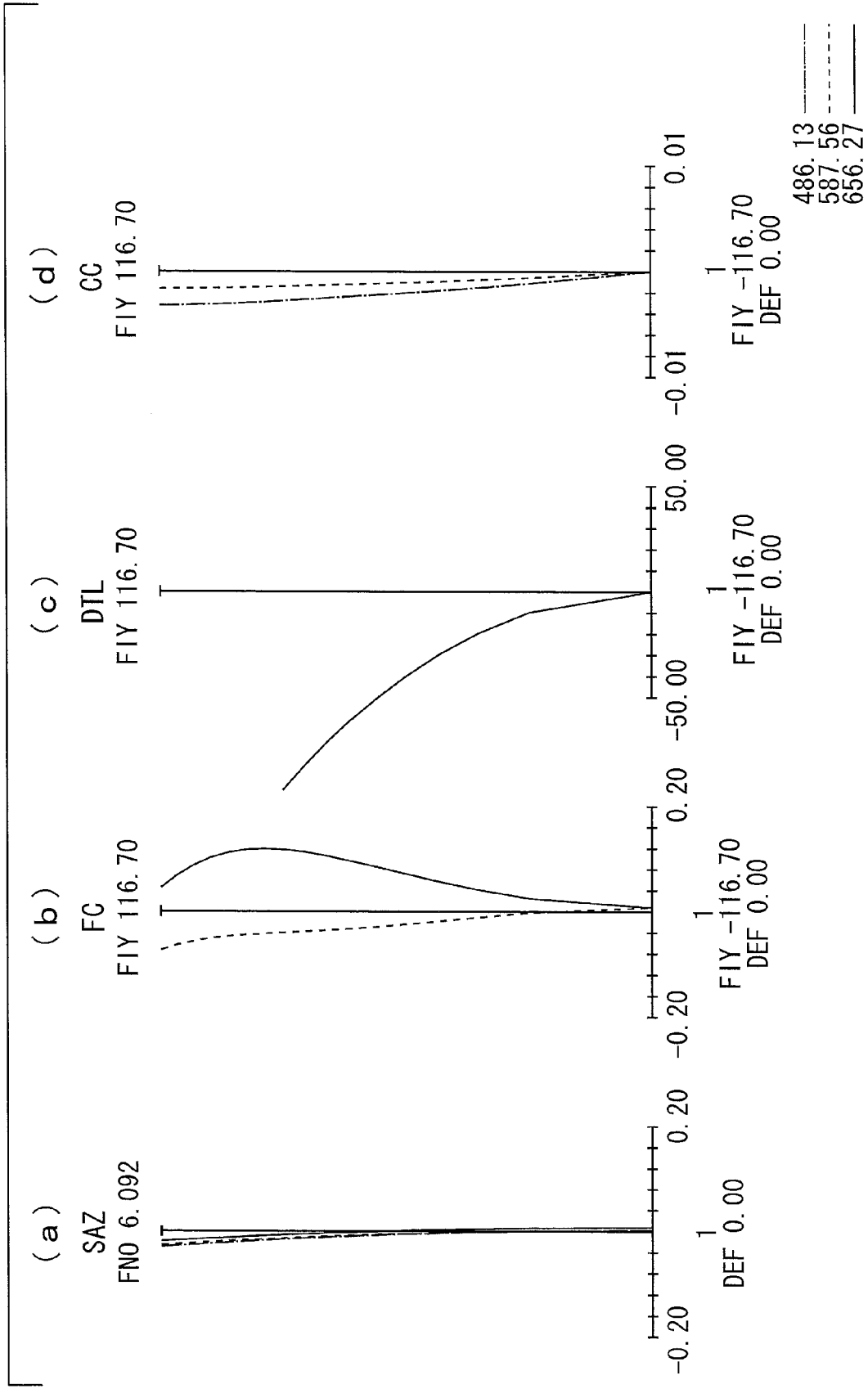
FIG. 5 is an aberration diagram of the imaging optical system in FIG. 4.

A lens sectional view of an imaging optical system according to Example 2 of the present invention is illustrated in FIG. 4, and the corresponding lens data is listed below.

The configuration of the back group of the imaging optical system according to this example differs from that according to Example 1. The back group contains, in order from the object side, a plano-convex lens having a convex surface facing the image side, a plano-convex lens having a convex surface facing the image side, a parallel plate, and a positive cemented lens. The cemented lens is formed by bonding together three lenses, in order from the object side: a biconvex lens (positive lens) having the surface with the larger curvature facing the image side, a biconcave lens (negative lens), and a biconvex lens (positive lens) having the surface with the larger curvature facing the image side.

In this way, by disposing the cemented lens, which is composed of three lenses, closest to the image in the optical system where the light rays separate, off-axis chromatic aberration, in particular, can be satisfactorily corrected. Also, spherical aberration and comatic aberration can be satisfactorily corrected.

The imaging optical system according to this example satisfies conditional expressions (1) to (7).

The aberration diagram for the imaging optical system according to this Example, configured as described above, is illustrated in FIG. 5.

Lens Data

| Surface number | Radius of curvature | Surface interval | Index of refraction | Abbe number |
|---|---|---|---|---|
| 1 | 3.302 | 0.50 | 2.17000 | 33.00 |
| 2 | 1.250 | 0.50 | | |
| 3 | 8.761 | 0.35 | 1.88300 | 40.76 |
| 4 | 0.650 | 1.36 | | |
| 5 | Aperture stop | 0.29 | | |
| 6 | ∞ | 0.62 | 1.62328 | 36.03 |
| 7 | −2.008 | 0.03 | | |
| 8 | ∞ | 0.61 | 1.48749 | 70.23 |
| 9 | −2.062 | 0.15 | | |
| 10 | ∞ | 0.30 | 1.51800 | 75.01 |
| 11 | ∞ (Flare stop) | 0.04 | | |
| 12 | 2.489 | 1.60 | 1.58913 | 61.14 |
| 13 | −1.253 | 0.40 | 1.92286 | 18.90 |
| 14 | 4.325 | 0.65 | 1.74397 | 44.85 |
| 15 | −4.034 | 0.57 | | |
| 16 | ∞ (Flare stop) | 0.03 | | |
| 17 | ∞ | 0.75 | 1.51633 | 64.14 |
| 18 | ∞ | 0.01 | 1.51000 | 63.01 |
| 19 | ∞ | 0.40 | 1.61061 | 50.20 |
| Image plane | ∞ | | | |

Example 3

Figure 6:
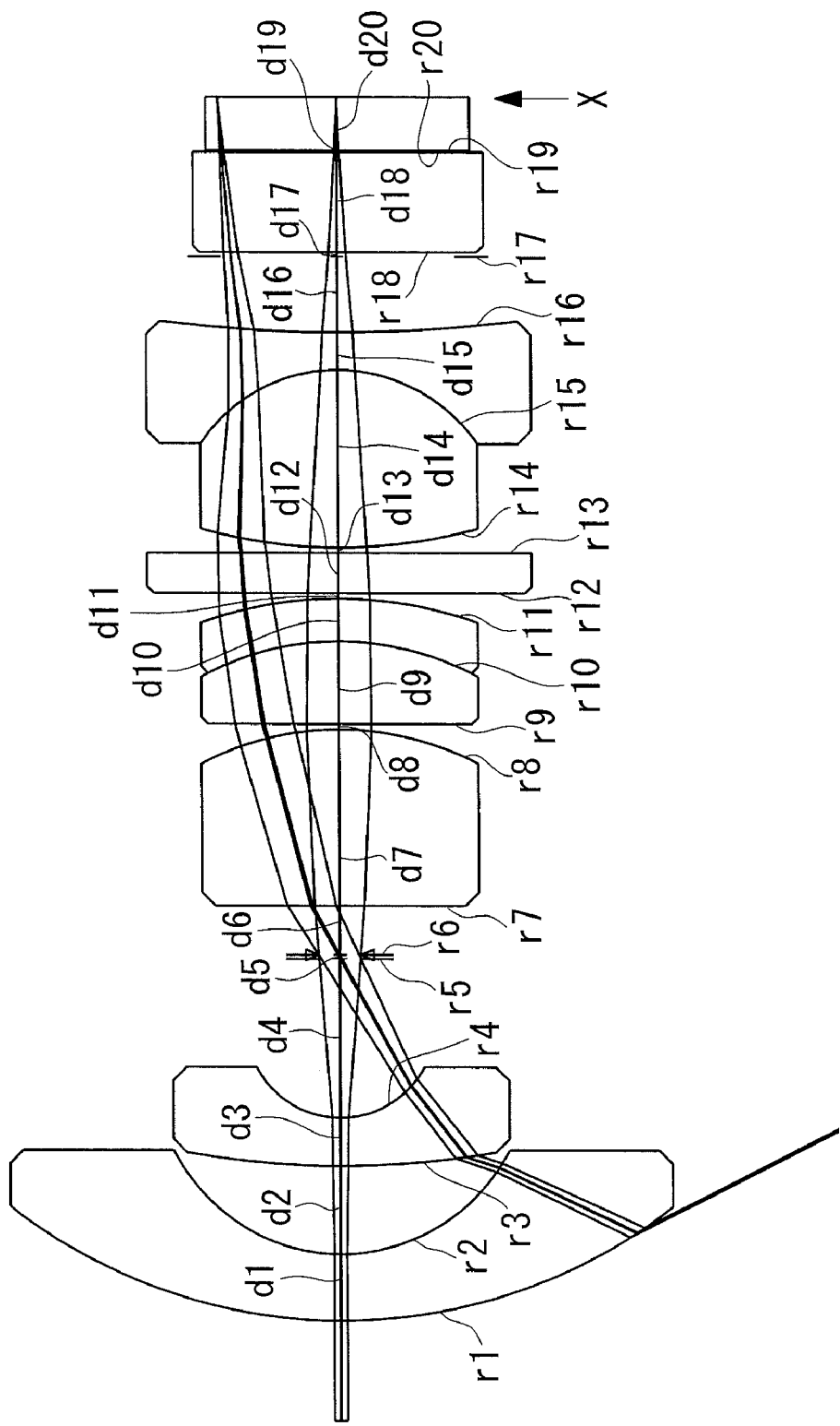
FIG. 6 is a lens sectional view of an imaging optical system according to Example 3 of the present invention.
Figure 7:
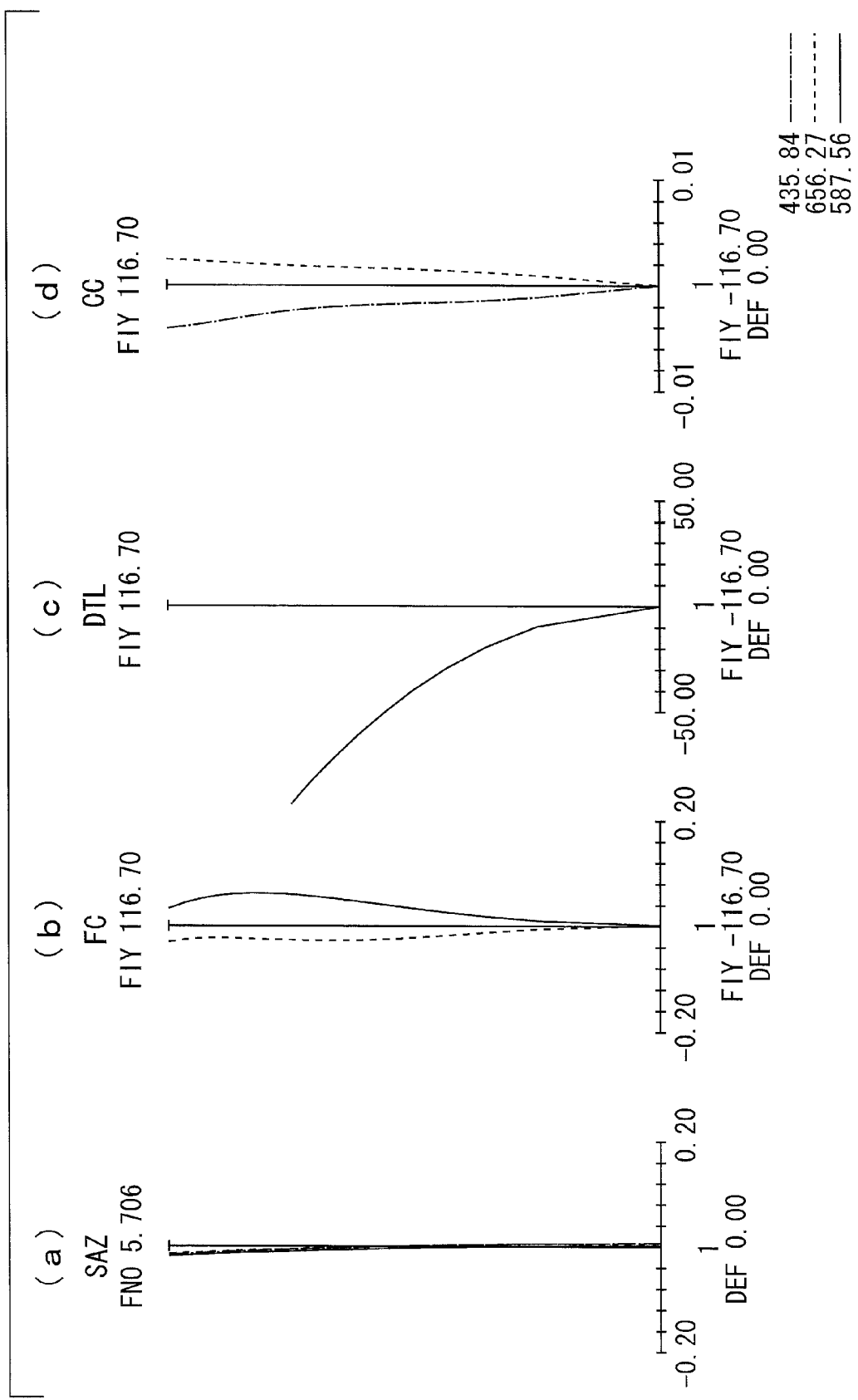
FIG. 7 is an aberration diagram of the imaging optical system in FIG. 6.

A lens sectional view of an imaging optical system according to Example 3 of the present invention is illustrated in FIG. 6, and the corresponding lens data is listed below.

The configuration of the back group of the imaging optical system according to this example differs from that according to Example 1. The back group contains, in order from the object side, a plano-convex lens having a convex surface facing the image side, a first positive cemented lens, a parallel plate, and a second positive cemented lens. The first positive cemented lens is formed by bonding together, in order from the object side, a plano-convex lens having a convex surface facing the image side and a negative meniscus lens having a convex surface facing the image side. The second positive cemented lens is formed by bonding together, in order from the object side, a biconvex lens (positive lens) having the surface with the larger curvature facing the image side and a biconcave lens (negative lens).

The imaging optical system according to this example satisfies conditional expressions (1) and (5) to (7).

The aberration diagram for the imaging optical system according to this Example, configured as described above, is illustrated in FIG. 7.

Lens Data

| Surface number | Radius of curvature | Surface interval | Index of refraction | Abbe number |
|---|---|---|---|---|
| 1 | 4.079 | 0.50 | 1.88300 | 40.76 |

-continued

| Surface number | Radius of curvature | Surface interval | Index of refraction | Abbe number |
|---|---|---|---|---|
| 2 | 1.425 | 0.66 | | |
| 3 | 6.765 | 0.36 | 1.81600 | 46.62 |
| 4 | 0.729 | 1.19 | | |
| 5 | ∞ (Flare stop) | 0.03 | | |
| 6 | Aperture stop | 0.37 | | |
| 7 | ∞ | 1.32 | 1.88300 | 40.76 |
| 8 | −2.280 | 0.04 | | |
| 9 | ∞ | 0.62 | 1.77250 | 49.60 |
| 10 | −2.211 | 0.32 | 1.84666 | 23.78 |
| 11 | −3.127 | 0.04 | | |
| 12 | ∞ | 0.30 | 1.51800 | 75.01 |
| 13 | ∞ | 0.04 | | |
| 14 | 3.968 | 1.33 | 1.77250 | 49.60 |
| 15 | −1.273 | 0.28 | 1.92286 | 18.90 |
| 16 | 10.721 | 0.57 | | |
| 17 | ∞ (Flare stop) | 0.03 | | |
| 18 | ∞ | 0.75 | 1.51633 | 64.14 |
| 19 | ∞ | 0.01 | 1.51000 | 63.01 |
| 20 | ∞ | 0.40 | 1.61061 | 50.20 |
| Image plane | ∞ | | | |

Example 4

Figure 8:
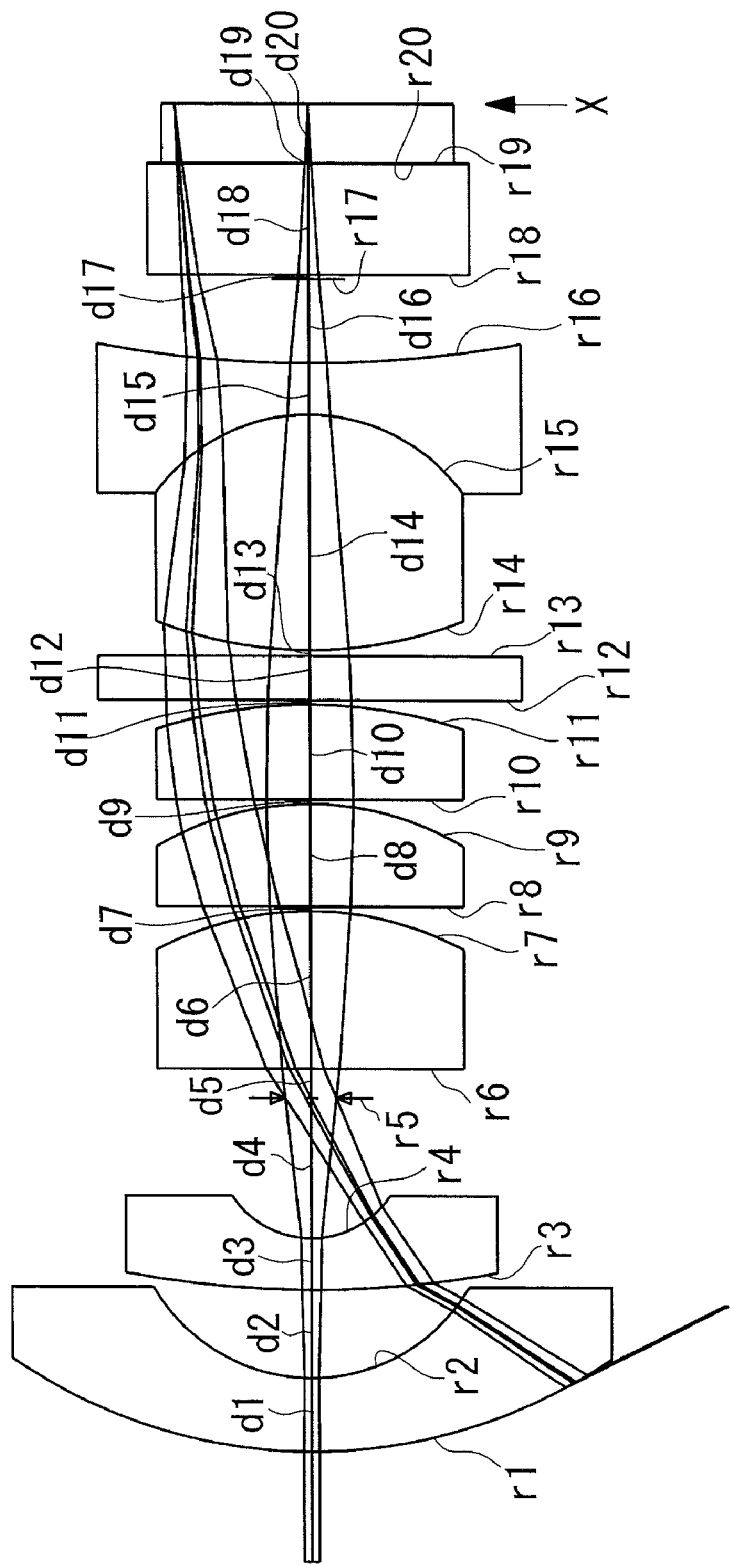
FIG. 8 is a lens sectional view of an imaging optical system according to Example 4 of the present invention.
Figure 9:
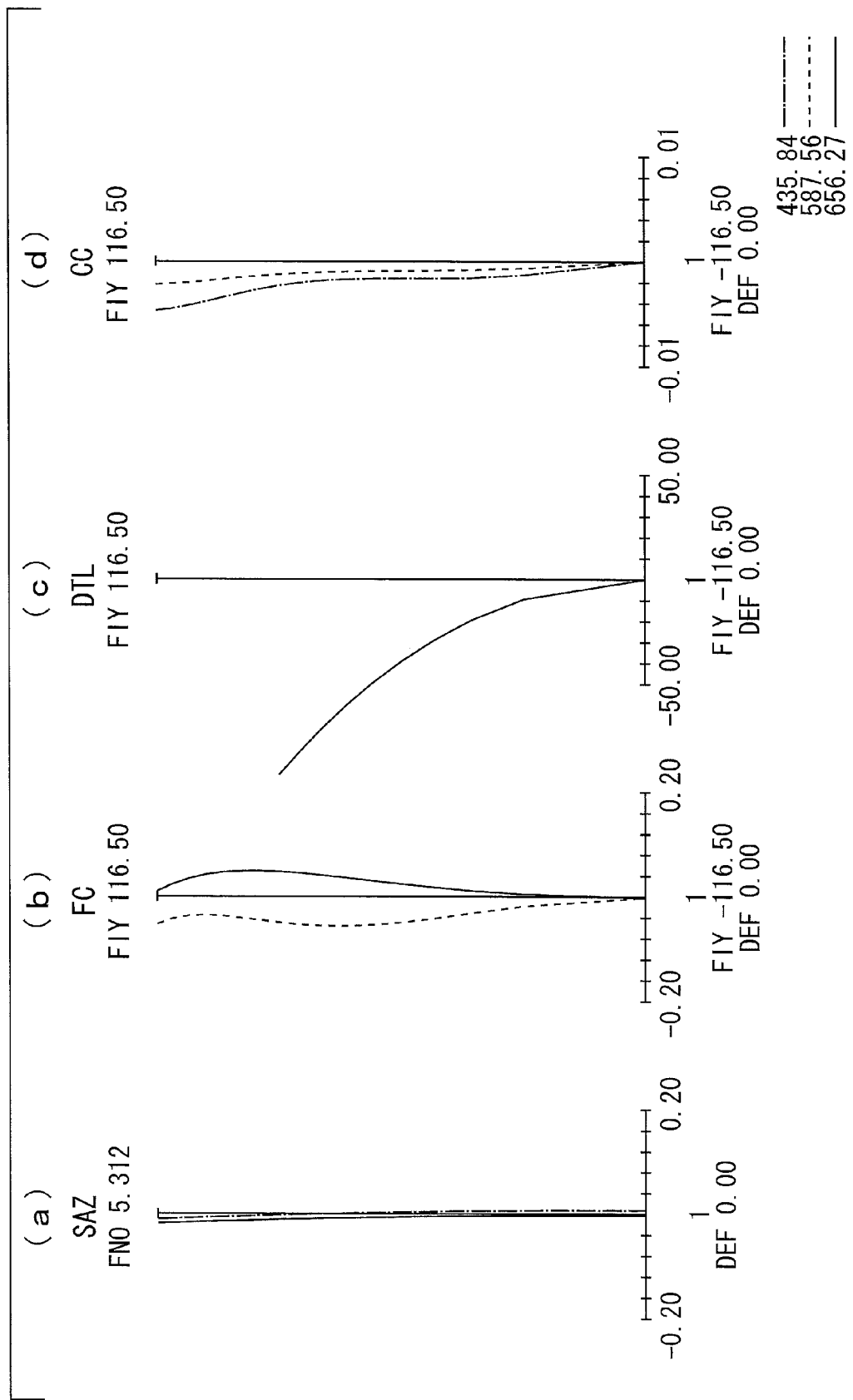
FIG. 9 is an aberration diagram of the imaging optical system in FIG. 8.

A lens sectional view of an imaging optical system according to Example 4 of the present invention is illustrated in FIG. 8, and the corresponding lens data is listed below.

The configuration of the back group of the imaging optical system according to this example differs from that according to Example 1. The back group contains, in order from the object side, a plano-convex lens having a convex surface facing the image side, a plano-convex lens having a convex surface facing the image side, a plano-convex lens having a convex surface facing the image side, a parallel plate, and a positive cemented lens. The positive cemented lens is formed by bonding together, in order from the object side, a biconvex lens (positive lens) having the surface with the larger curvature facing the image side and a biconcave lens (negative lens).

The imaging optical system according to this example satisfies conditional expressions (1) and (5) to (7).

The aberration diagram for the imaging optical system according to this Example, configured as described above, is illustrated in FIG. 9.

Lens Data

| Surface number | Radius of curvature | Surface interval | Index of refraction | Abbe number |
|---|---|---|---|---|
| 1 | 3.626 | 0.50 | 2.17000 | 33.00 |
| 2 | 1.250 | 0.60 | | |
| 3 | 6.990 | 0.35 | 1.77250 | 49.60 |
| 4 | 0.650 | 0.95 | | |
| 5 | Aperture stop | 0.20 | | |
| 6 | ∞ | 1.07 | 1.48749 | 70.23 |
| 7 | −2.240 | 0.03 | | |
| 8 | ∞ | 0.70 | 1.48749 | 70.23 |
| 9 | −2.051 | 0.03 | | |
| 10 | ∞ | 0.64 | 1.48749 | 70.23 |
| 11 | −3.403 | 0.03 | | |
| 12 | ∞ | 0.30 | 1.51800 | 75.01 |
| 13 | ∞ | 0.04 | | |
| 14 | 2.898 | 1.60 | 1.72916 | 54.68 |
| 15 | −1.300 | 0.35 | 1.92286 | 18.90 |

-continued

| Surface number | Radius of curvature | Surface interval | Index of refraction | Abbe number |
|---|---|---|---|---|
| 16 | 8.000 | 0.57 | | |
| 17 | ∞ | 0.03 | | |
| 18 | ∞ | 0.75 | 1.51633 | 64.14 |
| 19 | ∞ | 0.01 | 1.51000 | 63.01 |
| 20 | ∞ | 0.40 | 1.61061 | 50.20 |
| Image plane | ∞ | | | |

Example 5

Figure 10:
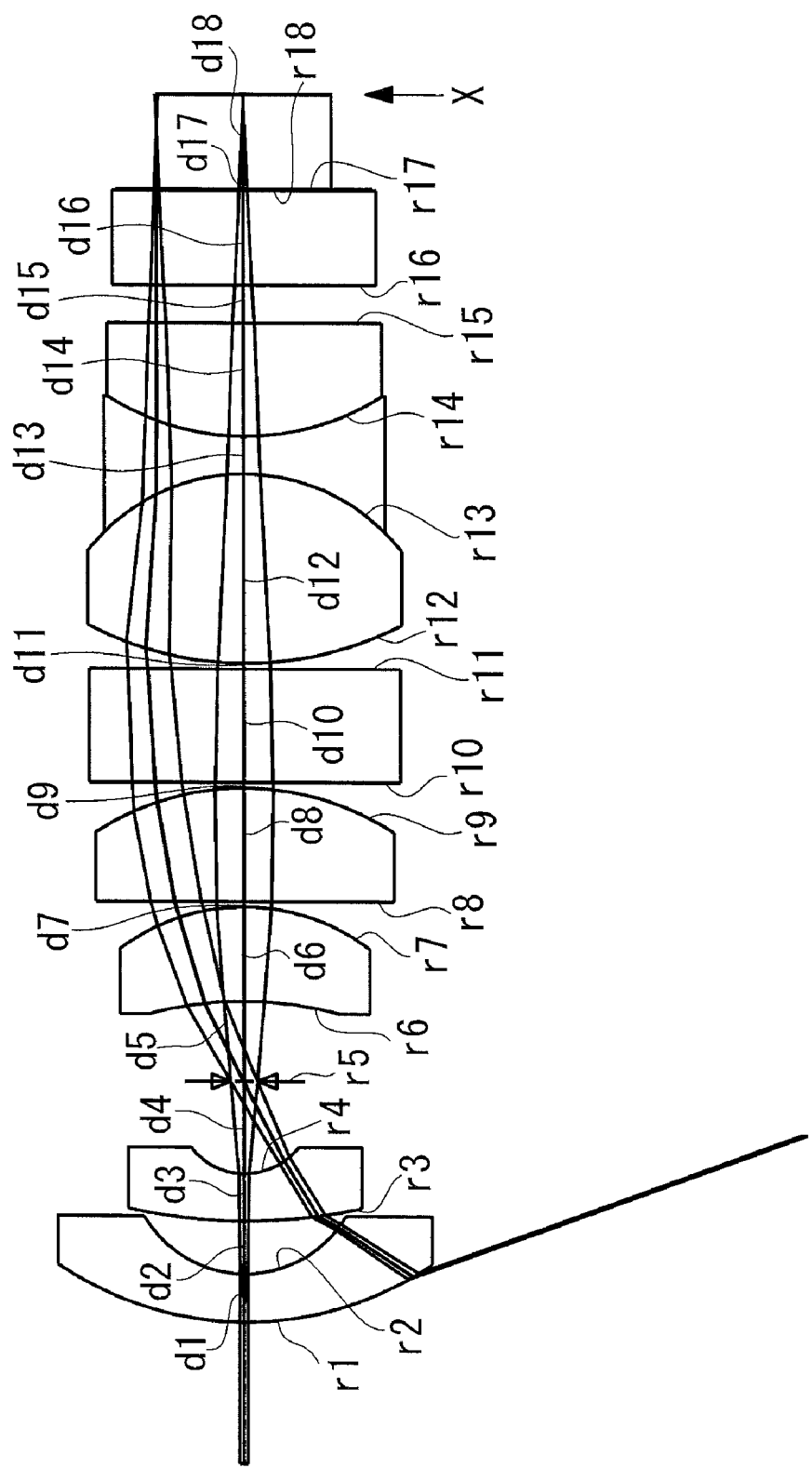
FIG. 10 is a lens sectional view of an imaging optical system according to Example 5 of the present invention.
Figure 11:
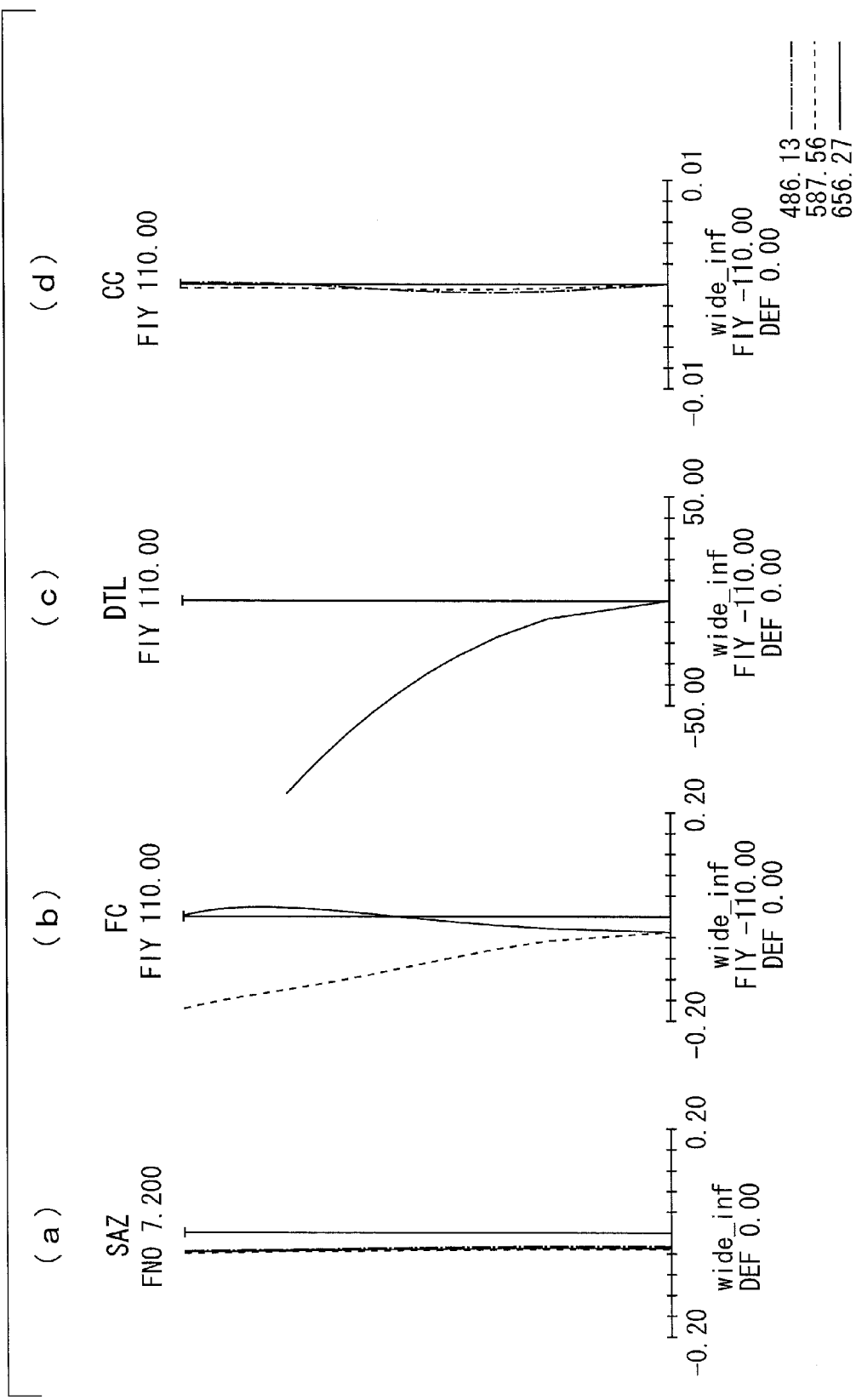
FIG. 11 is an aberration diagram of the imaging optical system in FIG. 10.

A lens sectional view of an imaging optical system according to Example 5 of the present invention is illustrated in FIG. 10, and the corresponding lens data is listed below.

The configuration of the back group of the imaging optical system according to this example differs from that according to Example 1. The back group contains, in order from the object side, a positive meniscus lens having a convex surface facing the image side, a plano-convex lens having a convex surface facing the image side, a parallel plate, and a positive cemented lens. The cemented lens is formed by bonding together three lenses, in order from the object side: a biconvex lens (positive lens) having the surface with the larger curvature facing the image side, a biconcave lens (negative lens), and a biconvex lens (positive lens) having the surface with the larger curvature facing the image side.

The imaging optical system according to this Example satisfies conditional expressions (1) to (7).

The aberration diagram for the imaging optical system according to this Example, configured as described above, is illustrated in FIG. 11.

Lens Data

| Surface number | Radius of curvature | Surface interval | Index of refraction | Abbe number |
|---|---|---|---|---|
| 1 | 1.799 | 0.25 | 2.17000 | 33.00 |
| 2 | 0.630 | 0.28 | | |
| 3 | 2.965 | 0.25 | 2.00330 | 28.27 |
| 4 | 0.364 | 0.49 | | |
| 5 | Aperture stop | 0.42 | | |
| 6 | −2.000 | 0.50 | 1.88300 | 40.76 |
| 7 | −1.119 | 0.03 | | |
| 8 | ∞ | 0.60 | 1.53172 | 48.84 |
| 9 | −1.477 | 0.03 | | |
| 10 | ∞ | 0.60 | 1.51965 | 75.01 |
| 11 | ∞ | 0.03 | | |
| 12 | 1.847 | 1.00 | 1.72916 | 54.68 |
| 13 | −1.070 | 0.20 | 1.92286 | 18.90 |
| 14 | 1.384 | 0.60 | 1.88300 | 40.76 |
| 15 | ∞ | 0.20 | | |
| 16 | ∞ | 0.50 | 1.51633 | 64.14 |
| 17 | ∞ | 0.01 | 1.51000 | 63.01 |
| 18 | ∞ | 0.50 | 1.51633 | 64.14 |
| Image plane | ∞ | | | |

Conditional expression values for the imaging optical systems according to above-described Examples 1 to 5 are listed in Table 1.

The specifications of the imaging optical systems according to Examples 1 to 5 are listed in Table 2.

In Table 2, "fb" represents the back focus; "total length" represents the air-equivalent length of the optical system; "angle of view" represents the half angle of view; and "total system focal length" represents the focal length of the entire optical system. The unit for the angle of view is degrees. The unit for fb, total length, total system focal length, and image height is mm.

In the above-described Examples, the half angle of view is preferably 100° or larger and, more preferably, larger than 110°. In this way, the total length and manufacturing costs can be reduced, and on-axis and off-axis chromatic aberrations can be satisfactorily corrected by disposing a cemented lens which is formed by joining together two lenses in the back group.

The present invention is advantageous in that it can be suitably employed in a small-diameter endoscope while having a sufficiently wide angle of view, and manufacturing costs can be reduced.

TABLE 1

| Conditional expression | Example 1 | Example 2 | Example 3 | Example 4 | Example 5 |
|---|---|---|---|---|---|
| (1) | 2.187 | 2.187 | 1.888 | 2.187 | 2.187 |
| (2) | 1.248 | 1.723 |  |  | 1.440 |
| (3) | 35.78 | 42.24 |  |  | 35.78 |
| (4) | 21.86 | 25.95 |  |  | 21.86 |
| (5) | 2.099 | 2.218 | 2.074 | 2.052 | 2.078 |
| (6) | 1.198 | 1.160 | 1.242 | 1.205 | 1.280 |
| (7) | 0.516 | 0.410 | 0.378 | 0.518 | 0.466 |

TABLE 2

|  | Example 1 | Example 2 | Example 3 | Example 4 | Example 5 |
|---|---|---|---|---|---|
| fb | 0.89 | 1.35 | 1.35 | 1.35 | 0.84 |
| Total length | 6.26 | 8.75 | 8.75 | 8.75 | 6.13 |
| View of angle | 110.5 | 116.7 | 116.7 | 116.5 | 110.0 |
| Total system focal length | 0.30 | 0.59 | 0.57 | 0.57 | 0.30 |
| Image height | 0.47 | 0.91 | 0.91 | 0.91 | 0.47 |

REFERENCE SIGNS LIST

1 imaging optical system
2 image acquisition device
FG front group
BG back group
L1 first lens
L2 second lens
L3 third lens
L4 fourth lens
L5 fifth lens
L6 sixth lens
L7 seventh lens
CL cemented lens
S aperture stop
CG cover glass
F parallel plate

The invention claimed is:

1. An imaging optical system comprising:
a negative front group;
an aperture stop; and
a positive rear group,
disposed in this order from an object side,
wherein:
the negative front group includes, in order from the object side, a negative first lens and a negative second lens,
the positive rear group includes a cemented lens including a positive lens and a negative lens joined together, and
the negative first lens satisfies conditional expression (1) below $$2.1 < nd1 < 2.4 \tag{1},$$

where nd1 represents the index of refraction at the d line of the negative first lens.

2. The imaging optical system according to claim 1, wherein:
in the positive rear group, the cemented lens is disposed closest to the image, and
the cemented lens includes, in order from the object side, a positive lens, a negative lens, and a positive lens, which are joined together.

3. The imaging optical system according to claim 1, wherein the positive rear group includes, in order from the object side, at least two positive lenses and the cemented lens including a positive lens, a negative lens, and a positive lens joined together.

4. The imaging optical system according to claim 2, wherein the cemented lens satisfies conditional expression (2):

$$0.5 < Pw5/Pw7 < 3.0 \tag{2},$$

where Pw5 represents a refractive power of a positive lens disposed closest to the object among the lenses composing the cemented lens, and Pw7 represents a refractive power of a positive lens disposed closest to the image among the lenses comprising the cemented lens.

5. The imaging optical system according to claim 2, wherein the cemented lens satisfies conditional expressions (3) and (4):

$$30 < vr5 - vr6 < 80 \tag{3}; and$$

$$20 < vr7 - vr6 < 80 \tag{4},$$

where vr5 represents the Abbe number of a positive lens disposed closest to the object among the lenses comprising the cemented lens, vr6 represents the Abbe number of a negative lens among the lenses of the cemented lens, and vr7 represents the Abbe number of a positive lens disposed closest to the image among the lenses comprising the cemented lens.

6. The imaging optical system according to claim 1, wherein the negative first lens satisfies conditional expression (5):

$$1.0 < (r1+r2)/(r1-r2) < 5.0 \tag{5},$$

where r1 represents the radius of curvature of the object-side surface of the negative first lens, and r2 represents the radius of curvature of the image-side surface of the negative first lens.

7. The imaging optical system according to claim 1, wherein the negative second lens satisfies conditional expression (6):

$$0.5 < (r3+r4)/(r3-r4) < 6.0 \tag{6},$$

where r3 represents the radius of curvature of the object-side surface of the negative second lens, and r4 represents the radius of curvature of the image-side surface of the negative second lens.

8. The imaging optical system according to claim 1, wherein the front group satisfies conditional expression (7):

$$0.2 < Pw1/Pw2 < 2.0 \tag{7},$$

where Pw1 represents a refractive power of the negative first lens, and Pw2 represents a refractive power of the negative second lens.

9. An image acquisition apparatus comprising:

the imaging optical system according to claim 1;

an image acquisition unit configured to acquire an optical image formed by the imaging optical system and to convert the acquired optical image to a digital image; and an image processing unit configured to generate a corrected image by subjecting the digital image acquired by the image acquisition unit to image processing for correcting aberration in the digital image.

10. An image acquisition apparatus comprising:

the imaging optical system according to claim 1;

an image acquisition unit configured to acquire an optical image formed by the imaging optical system and to convert the acquired optical image to a digital image; and a correction circuit configured to electrically correct chromatic aberration of magnification of the digital image acquired by the image acquisition unit.

* * * * *